United States Patent
Kim et al.

(10) Patent No.: US 9,752,644 B2
(45) Date of Patent: Sep. 5, 2017

(54) NON-ADHESIVE TYPE VIBRATION REDUCTION APPARATUS

(71) Applicant: KOREA AEROSPACE RESEARCH INSTITUTE, Daejeon (KR)

(72) Inventors: Dae Kwan Kim, Daejeon (KR); Hong-Taek Choi, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/101,657

(22) PCT Filed: Dec. 2, 2014

(86) PCT No.: PCT/KR2014/011708
§ 371 (c)(1),
(2) Date: Jun. 3, 2016

(87) PCT Pub. No.: WO2015/084025
PCT Pub. Date: Jun. 11, 2015

(65) Prior Publication Data
US 2017/0002893 A1   Jan. 5, 2017

(30) Foreign Application Priority Data

Dec. 6, 2013  (KR) .......... 10-2013-0151390

(51) Int. Cl.
*F16M 13/00* (2006.01)
*F16F 15/08* (2006.01)
*F16M 11/22* (2006.01)
*B64G 1/22* (2006.01)

(52) U.S. Cl.
CPC ............ *F16F 15/08* (2013.01); *F16M 11/22* (2013.01); *B64G 2001/228* (2013.01); *F16M 2200/08* (2013.01)

(58) Field of Classification Search
USPC ........................................... 248/634
See application file for complete search history.

(56) References Cited

U.S. PATENT DOCUMENTS

| 4,032,202 A | * | 6/1977 | Ishikawa | ................ B60G 7/00 267/280 |
| 5,730,429 A | * | 3/1998 | Ivers | .................... F16F 1/3605 267/140.14 |
| 5,971,375 A | * | 10/1999 | Simonian | ............... F16F 15/02 267/136 |

(Continued)

FOREIGN PATENT DOCUMENTS

| JP | 08265612 A | 10/1996 |
| JP | 2011504571 A | 2/2011 |

(Continued)

OTHER PUBLICATIONS

International Search Report for corresponding International PCT Application No. PCT/KR2014/011708, dated Jan. 8, 2015.

*Primary Examiner* — Monica Millner
(74) *Attorney, Agent, or Firm* — Hauptman Ham, LLP

(57) ABSTRACT

Provided is a non-adhesive type vibration reduction apparatus comprising: a support; a body; and an elastomer, wherein the elastomer is coupled in a non-adhesive manner in which an adhesive is not used, thereby preventing a separation of and reducing a damage of an elastomer which result from a weakening of an adhesive force.

11 Claims, 5 Drawing Sheets

(56) References Cited

U.S. PATENT DOCUMENTS

| | | | |
|---|---|---|---|
| 7,637,359 B2* | 12/2009 | Melz | F16F 15/007 |
| | | | 188/266.7 |
| 7,770,464 B2* | 8/2010 | Melz | G01N 3/38 |
| | | | 73/808 |
| 2007/0158887 A1* | 7/2007 | Ogata | F16F 15/02 |
| | | | 267/136 |
| 2009/0008504 A1* | 1/2009 | Camarasa | F16F 15/08 |
| | | | 244/173.2 |
| 2010/0006705 A1* | 1/2010 | Faucheux | B64G 1/286 |
| | | | 244/165 |
| 2010/0264290 A1* | 10/2010 | Camarasa | B64G 1/283 |
| | | | 248/603 |

FOREIGN PATENT DOCUMENTS

| KR | 1020080085180 A | 9/2008 |
|---|---|---|
| KR | 1020110066347 A | 6/2011 |

* cited by examiner

【FIG. 1】
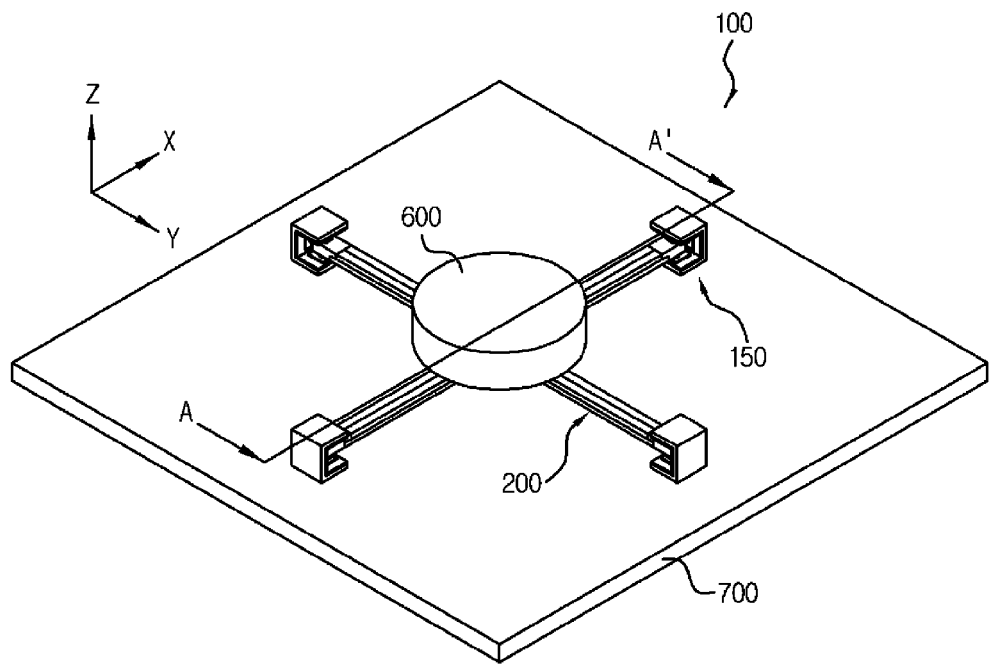
【FIG. 2】
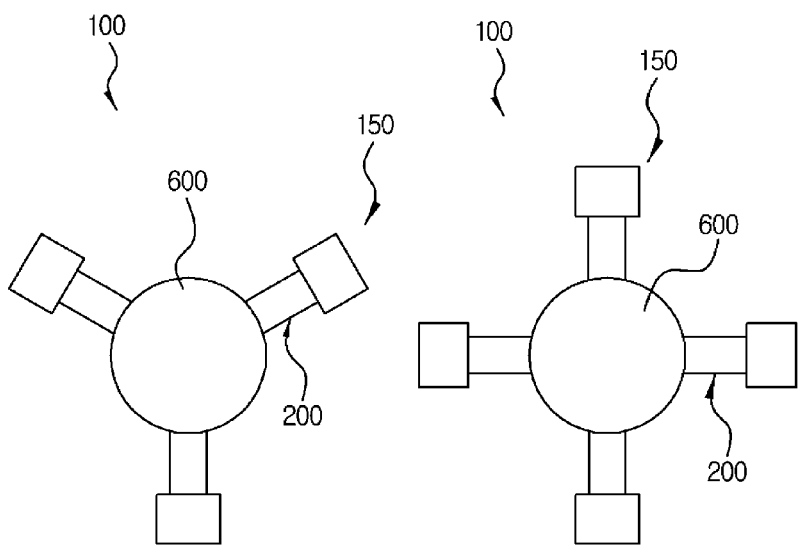
(a)          (b)

【FIG. 3】
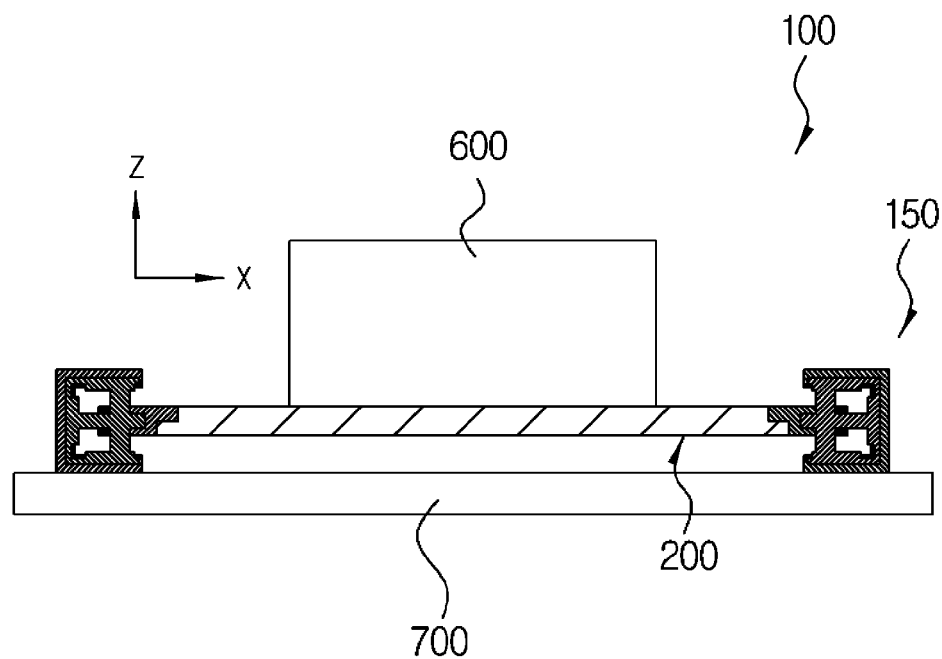
【FIG. 4】
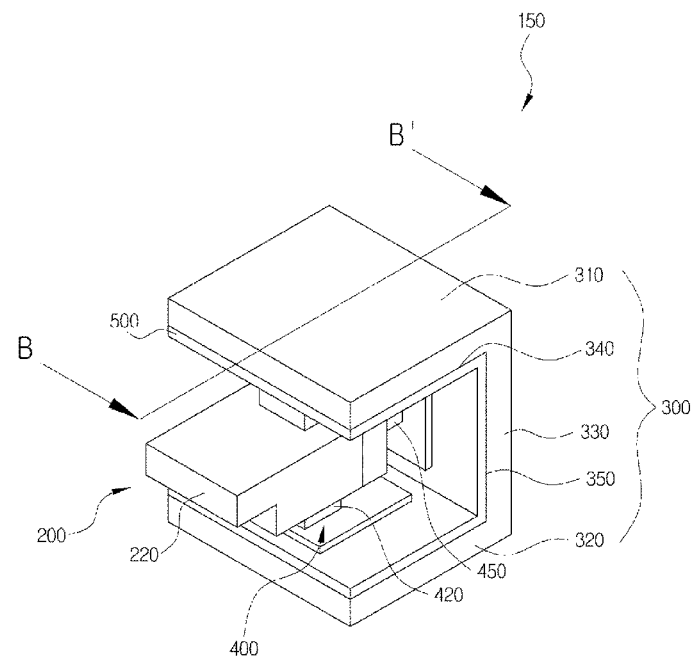

【FIG. 5】
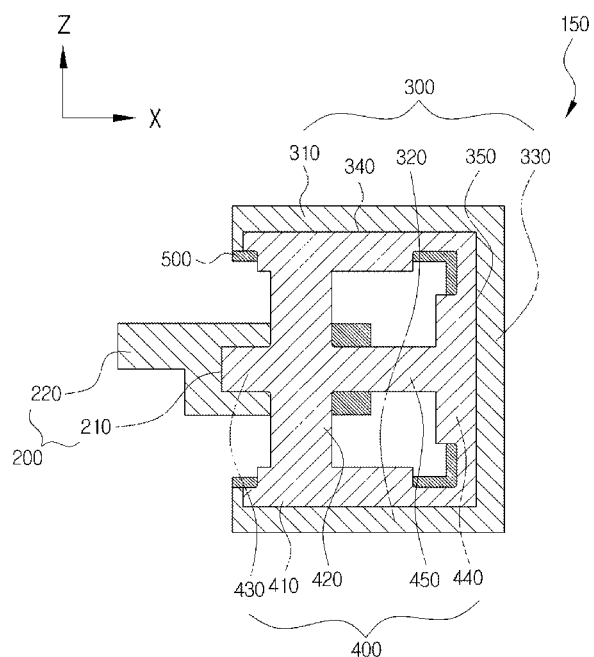
【FIG. 6】
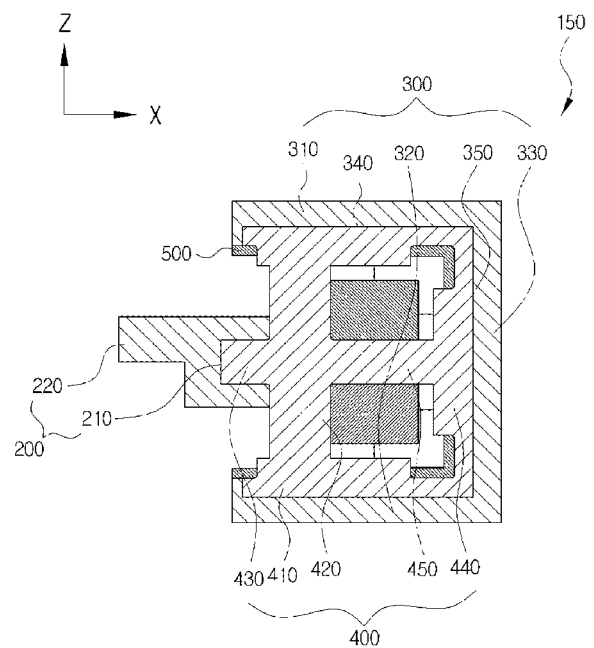

[FIG. 7]
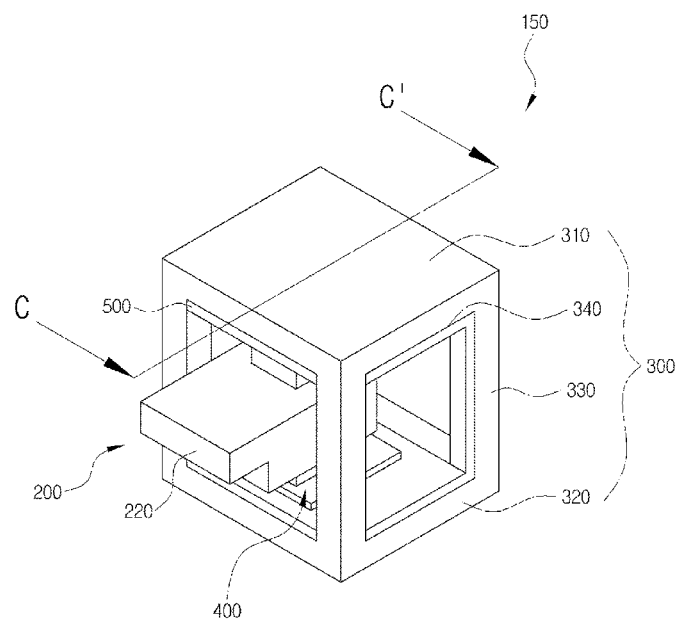
[FIG. 8]
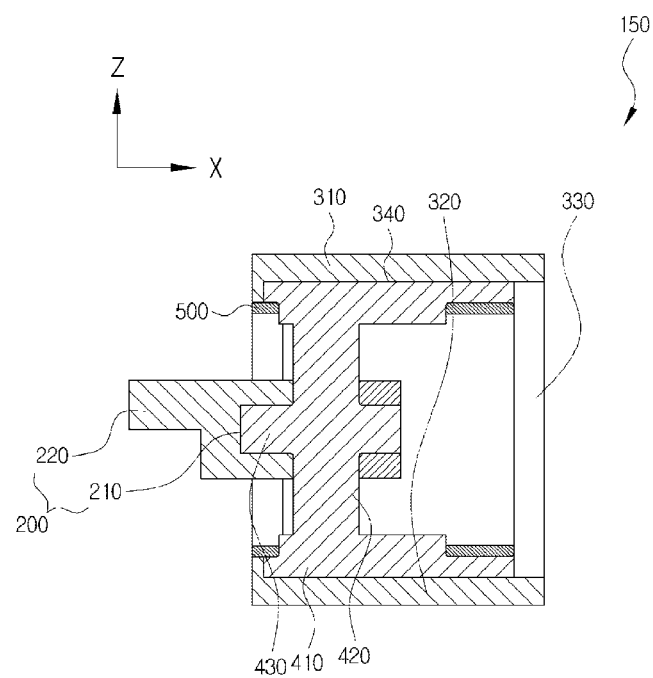

[FIG. 9]
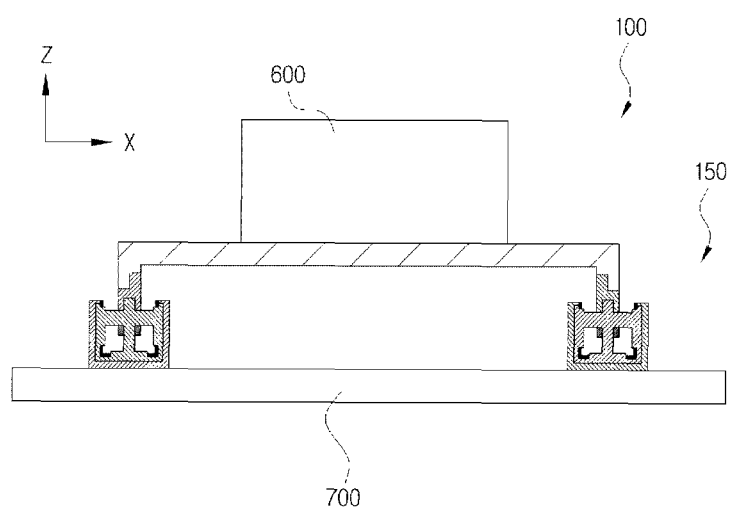

NON-ADHESIVE TYPE VIBRATION REDUCTION APPARATUS

TECHNICAL FIELD

The present invention relates to a vibration reduction apparatus using an elastomer as a vibration reduction material, and more particularly, to a vibration reduction apparatus which does not use an adhesive when an elastomer is coupled.

BACKGROUND ART

An artificial satellite consists of several systems. Among those, an attitude and trajectory control system directs a satellite to the desired direction and stabilizes the satellite while on duty, against disturbance elements affecting the attitude and trajectory of the satellite. Various sensors need to be used to detect an attitude error occurring due to external disturbances, and advanced apparatuses and technologies are used depending on requirements of accuracy.

The attitude information of the satellite is measured and predicted using various sensors. In this case, it is compared whether the detected attitude information is different from the desired value and then if there is the difference, an actuator is operated to correct the difference.

When the operator intends to direct the satellite to the desired attitude or maintain the satellite at the desired attitude, an actuator such as a reaction wheel is used. The actuator (vibration source) may cause a high frequency micro vibration. The high frequency micro vibration acts as one of the main factors of reducing directional stability of the satellite or performance of various systems mounted. Therefore, a high resolution satellite uses a vibration controller reducing the micro vibration.

Generally, the vibration controller may be classified into a passive controller, an active controller, and a semi-active controller.

The active vibration reduction apparatus is an apparatus for reducing a vibration using an active element, and uses an appropriate control technique according to a frequency range to be isolated and system characteristics. In this case, there is a problem in that the active vibration reduction apparatus needs to be designed again when a target frequency to be isolated is different from the designed ranges.

The passive vibration reduction apparatus is a technology of dispersing energy generated from the vibration source. The passive vibration reduction apparatus is easily implemented, and when the target frequency to be reduced is defined, the passive vibration reduction apparatus has excellent vibration reduction characteristics and functional reliability in a high frequency region, and thus has been mainly used as the apparatus for reducing vibrations of an artificial satellite.

Generally, the vibration controller has mainly used an elastomer as a vibration reduction material. The vibration controller is installed between the vibration source and a structure, and reduces a vibration generated from the vibration source in the elastomer that is an elastic body, thereby the vibration does not influence the structure.

Korean Patent Laid-Open Publication No. 10-2008-0085180 (Elastomer-based modular multi-axis vibration/shock isolation device, published on Sep. 23, 2008) discloses a vibration reduction apparatus using an elastomer. Generally, in the vibration reduction apparatus using an elastomer, the elastomer is mainly coupled by an adhesive. The adhesive type vibration reduction apparatus may have a weakened adhesive force depending on environment, vibration conditions, or the like. In particular, when an adhesive is used under poor environment such as space environment, more problems may be caused. If the elastomer is separated due to the weakened adhesive force, the vibration reduction apparatus does not perform its own function, and therefore the performance of the artificial satellite may be reduced.

DISCLOSURE

Technical Problem

An object of the present invention is to provide a non-adhesive type vibration reduction apparatus capable of preventing a separation of and reducing a damage of an elastomer by forming a vibration reduction apparatus without using an adhesive when an elastomer is coupled, thereby increasing durability.

Technical Solution a non-adhesive type vibration reduction apparatus 100 disposed between a vibration source 600 and a structure 700 spaced apart from each other in a z direction based on a 3-dimensional xyz coordinate system, and using an elastomer to reduce a vibration of the vibration source 600, comprising: a support 200 formed on an xy plane and coupled to a side of the vibration source 600 which is toward the structure 700; a body 300 including an upper side wall 310, a lower side wall 320 spaced apart from the upper side wall 310 by a predetermined distance, and a connection portion 330 connecting between the upper side wall 310 and the lower side wall 320, and coupled to a side of the structure 700 which is toward the vibration source 600; and an elastomer 400 including a base 410 coupled to the body 300 and a first elastic portion 420 protruding and extending from the base 410 in the z direction.

An end of the support 200 may be provided with a first groove.

The body 300 may include a second groove 340 which is formed on an inner surface of the upper side wall 310 and the lower side wall 320.

The base 410 may have an outside shape corresponding to an inside shape of the second groove 340, and is coupled to the second groove 340.

The elastomer 400 may further include a protruding portion 430 protruding from the first elastic portion 420 and the protruding portion 430 may be coupled to the first groove 210.

The connection portion 330 may comprises a side wall 330 enclosing the upper side wall 310 and the lower side wall 320 and having one opened form or a plurality of opened forms, and a third groove 350 formed on an inner surface of the side wall 330.

The elastomer 400 may further include a side wall base 440 having an outside shape corresponding to an inside shape of the third groove 350, and a second elastic portion 450 protruding and extending from the side wall base 440 to the first elastic portion 420.

The connection portion 330 may comprise a plurality of pillars 330.

The non-adhesive type vibration reduction apparatus 100 may further comprise a cover 500 disposed where the body 300 and the elastomer 400 are coupled.

Corners of the respective coupled parts of the support 200, the body 300, the elastomer 400, and the cover 500 may have a curvature.

The support 200 may be provided with a separation portion 220 which is separated from and coupled to the support 200.

a module 150 consisting of the body and the elastomer is separated by the separation portion 220, and is coupled to the support 200 in several directions by rotating the module 150.

Advantageous Effects

According to the exemplary embodiment of the present invention, the non-adhesive type vibration reduction apparatus may reduce the damage of the elastomer which results from the weakening of the adhesive force without using the adhesive when the elastomer is coupled.

According to the exemplary embodiment of the present invention, each component of the non-adhesive type vibration reduction apparatus may be independently manufactured, so that the coupling of the respective components is simple, and the replacement and repair of the components at the time of the damage are easy.

DESCRIPTION OF DRAWINGS

The above and other objects, features and advantages of the present invention will become apparent from the following description of preferred embodiments given in conjunction with the accompanying drawings, in which:

FIG. 1 is a perspective view of a non-adhesive type vibration reduction apparatus according to an exemplary embodiment of the present invention;

FIG. 2 is a disposition view of the non-adhesive type vibration reduction apparatus according to the exemplary embodiment of the present invention;

FIG. 3 is a cross-sectional view of the non-adhesive type vibration reduction apparatus according to the exemplary embodiment of the present invention;

FIG. 4 is a perspective view of a non-adhesive type vibration reduction apparatus according to a first exemplary embodiment of the present invention;

FIG. 5 is a cross-sectional view of the non-adhesive type vibration reduction apparatus according to the first exemplary embodiment of the present invention;

FIG. 6 is a diagram illustrating a cover according to another exemplary embodiment of the present invention;

FIG. 7 is a perspective view of a non-adhesive type vibration reduction apparatus according to a second exemplary embodiment of the present invention;

FIG. 8 is a cross-sectional view of the non-adhesive type vibration reduction apparatus according to the second exemplary embodiment of the present invention; and FIG. 9 is a diagram illustrating a method for coupling a vibration reduction apparatus according to another exemplary embodiment of the present invention.

[Detailed Description of Main Elements]

100: Non-adhesive type vibration reduction apparatus
150: Vibration reduction apparatus module
200: Support
210: First groove
220: Separation portion
300: Body
310: Upper side wall
320: Lower side wall
330: Connection portion, Side wall, Pillar
340: Second groove -continued

[Detailed Description of Main Elements]

350: Third groove
400: Elastomer
410: base
420: First elastic portion
430: Protruding portion
440: Side wall base
450: Second elastic portion
500: Cover
600: Vibration source
700: Structure

BEST MODE

Hereinafter, a technical spirit of the present invention will be described in more detail with reference to the accompanying drawings.

The accompanying drawings are only examples illustrated in order to describe the technical idea of the present invention in more detail. Therefore, the technical idea of the present invention is not limited to forms of the accompanying drawings.

FIG. 1 is a perspective view of a non-adhesive type vibration reduction apparatus 100 according to an exemplary embodiment of the present invention.

As illustrated in FIG. 1, the non-adhesive type vibration reduction apparatus 100 according to the exemplary embodiment of the present invention comprises a support 200, a body 300, and an elastomer 400.

Meanwhile, a separation portion 220 is formed on the support 200 and a part separated from the support 200 by the separator 220 is called a module 150.

The non-adhesive type vibration reduction apparatus 100 according to the exemplary embodiment of the present invention is installed between a vibration source 600 and a structure 700 spaced in a z direction based on a 3-dimensional xyz coordinate system to reduce the vibration of the vibration source 600 through the use of the elastomer 400.

Describing in more detail, the non-adhesive type vibration reduction apparatus according to the exemplary embodiment of the present invention is formed at one side of the support 200, the other side of the support 200 is coupled to a side of the vibration source 600 which is toward the structure 700, and the body 300 is coupled to a side of the structure 700 which is toward the vibration source 600.

Meanwhile, FIG. 2 is a disposition view of the non-adhesive type vibration reduction apparatus 100 according to the exemplary embodiment of the present invention.

The vibration of the vibration source 600 may be generated in all directions of an x axis, a y axis, and a z axis, and at the same time the vibration may be generated in several directions.

For example, if it is assumed that the vibration of the vibration source 600 is generated in the x-axis and y-axis directions, there is a limitation in that it is difficult to support the vibration generated in the y axis when the only two supports 200 and modules 150 are formed in the x-axis direction.

Therefore, as illustrated in FIGS. 2(*a*) and 2(*b*), at least three supports 200 and three modules 150 formed on an xy plane are needed. As a result, the supports 200 and the modules 150 are radially disposed to stably support the vibration source, thereby reducing the vibration.

According to the exemplary embodiment of the present invention, since the vibration source and the structure are spaced apart from each other in a vertical direction, for convenience, the vertical direction is called the z direction. Accordingly, the present invention describes that the vibration source and the structure are coupled to each other in the z direction.

However, the vibration source and the structure are not necessarily spaced apart from each other in a vertical direction, and therefore the vertical direction is not necessarily the z direction. Accordingly, the vibration source and the structure may be provided in several directions through the rotation of the xyz coordinate system.

For example, when the vibration source and the structure are spaced apart from each other in a horizontal direction, in the present invention, the horizontal direction may be called the z direction through the rotation of the xyz coordinate system.

FIG. 3 is a cross-sectional view of the non-adhesive type vibration reduction apparatus 100 according to an exemplary embodiment of the present invention taken along the line A-A'.

As illustrated in FIG. 3, the support 200 is formed on the xy plane and the separation portion 220 is formed on the support 200, such that the module 150 can be separated from and coupled to the support 200.

Unlike the related art, the non-adhesive type vibration reduction apparatus 100 according to the exemplary embodiment of the present invention does not use the adhesive but uses grooves and protrusions which are formed on the respective components, such that those are coupled in such a manner that the protrusions are inserted into the grooves. Therefore, the performance of the vibration reduction apparatus 100 may be maintained for a long period of time by preventing the elastomer 400 from being separated due to the weakening of the adhesive force.

FIG. 4 illustrates a non-adhesive type vibration reduction apparatus module 150 according to a first exemplary embodiment of the present invention and FIG. 5 is a cross-sectional view of the non-adhesive type vibration reduction apparatus module 150 according to the first exemplary embodiment of the present invention taken along the line B-B'.

The end of the support 200 is provided with a first groove 210.

The body 300 is configured to include an upper side wall 310, a lower side wall 320 spaced apart from the upper side wall 310 by a predetermined distance, a connection portion 330 connecting between the upper side wall 310 and the lower side wall 320, and a second groove 340 formed on an inner surface of the upper side wall 310 and the lower side wall 320.

The elastomer 400 is configured to include a base 410 having an outside shape corresponding to an inside shape of the second groove 340, a first elastic portion 420 protruding and extending from the base 410 in the z direction, and a protruding portion 430 protruding from the first elastic portion 420.

The elastomer 400 is inserted into the second groove 340 and is coupled to the body 300. The second groove 340 is formed in a single groove or a plurality of grooves.

The base 410 may have a size covering only the second groove 340 or may have a size covering the whole inner surface of the upper side wall 310 and the lower side wall 320.

When the base 410 has a size covering only the second groove 340, the support 200 may be damaged or cracked by colliding with the body 300 due to the vibration of the vibration source 600. Therefore, the base 410 may more preferably have a size covering the whole inner surface of the upper side wall 310 and the lower side wall 320.

The protruding portion 430 is formed to correspond to the inside shape of the first groove 210, and thus is inserted into the first groove 210. In this case, it is more preferable that the first groove 210 is dented enough to have both of the protruding portion 430 and the first elastic portion 420 inserted thereinto, such that the elastomer 400 may be firmly coupled to the support 200.

The connection portion 330 comprises a side wall 330 enclosing the upper side wall 310 and the lower side wall 320. In this case, the side wall 330 facing the protruding portion 430 always has the opened form, and therefore the elastomer 400 may be coupled to the support 200. (The side wall 330 is one of several means implementing the connection portion 330 and performs the same role as the connection portion 330, and therefore is denoted by the same reference numeral.

Meanwhile, the inside of the side wall 330 is provided with a third groove 350 and the elastomer 400 is inserted into the third groove 350. In this case, the elastomer 400 further includes a side wall base 440 having an outside shape corresponding to an inside shape of the third groove 350, and the side wall base 440 is inserted into the third groove 350 to be coupled thereto.

The elastomer 400 is provided with a second elastic portion 450 protruding and extending from the side wall base 440 to the first elastic portion 420.

The side wall 330 is formed in the x-axis direction, and therefore the body 300 is formed to enclose the x axis and the z axis of the support 200, such that the vibration of the vibration source 600 may be stably reduced by the first elastic portion 420 and the second elastic portion 450.

Alternatively, the side wall 330 is formed in the x-axis and y-axis directions, and therefore the body 300 may be formed to enclose the x axis, the y axis and the z axis of the support 200, such that the vibration of the vibration source 600 may be more stably reduced by the first elastic portion 420 and the second elastic portion 450.

Meanwhile, as described above, the elastomer 400 is inserted into the first groove 210, the second groove 340, and the third groove 350 to be coupled thereto. As a result, the elastomer 400 may be separated from the first groove 210, the second groove 340, and the third groove 350 due to the vibration of the vibration source 600.

Therefore, in the non-adhesive type vibration reduction apparatus 100 according to the exemplary embodiment of the present invention, the coupled part of the elastomer 400 is further provided with the cover 500, and therefore the coupling of the elastomer 400 may be stably made. The cover 500 may be coupled in a manner in that it is inserted into the groove formed on the inner surface of the elastomer 400 and the body 300, and may be coupled to the elastomer 400 and the body 300 by using parts such as a piece and a bolt.

Corners of the respective coupled parts of the support 200, the body 300, the elastomer 400, and the cover 500 may be easily damaged due to a load generated by the vibration, and therefore the corners of the respective coupled parts are formed to have a curvature, thereby preventing the damage.

FIG. 6 illustrates the cover 500 according to another exemplary embodiment of the present invention.

When a large load deviating from a rated load is generated from the vibration source 600, the support 200 moves a lot and the elastomer 400 connected to the support 200 moves a lot as well. In this case, the support 200 may be damaged due to a repetitive movement.

Therefore, as illustrated in FIG. 6, the cover 500 of the coupled part of the support 200 and the elastomer 400 extends toward the inner wall of the elastomer 400 to first contact the inner wall of the elastomer 400.

That is, a distance between the elastomer 400 and the cover 500 is reduced by the extension of the cover 500, and therefore the cover 500 easily contacts the inner wall of the elastomer 400.

By doing so, the support 200 has a limited movable distance, and as a result the damage by the repetitive movement may be reduced and the movement by the vibration may quickly stop.

FIG. 7 illustrates the non-adhesive type vibration reduction apparatus module 150 according to a second exemplary embodiment of the present invention and FIG. 8 is a cross-sectional view of the non-adhesive type vibration reduction apparatus module 150 according to the second exemplary embodiment of the present invention taken along the line C-C'.

As illustrated in FIGS. 7 and 8, the connection portion 330 may comprises a pillar 330. The pillar 330 is formed in plural and the pillar 330 has a thickness enough to firmly fix the upper side wall 310 and the lower side wall 320. (The pillar 330 is one of several means implementing the connection portion 330 and performs the same role as the connection portion 330, and therefore is denoted by the same reference numeral.)

To reduce the vibration of the vibration source 600, a displacement between the upper side wall 310 and the lower side wall 320 needs to be constantly maintained and fixed. Therefore, the present invention describes that the connection portion 330 is illustrated in the form of the side wall or the pillar 330, but as long as the connection portion may constantly maintain and fix the displacement between the upper side wall 310 and the lower side wall 320, the connection portion may be changed in design to any connection means.

FIG. 9 is a diagram illustrating a method for coupling a vibration reduction apparatus 100 according to another exemplary embodiment of the present invention.

As illustrated in FIG. 9, the module 150 and the support 200 may be coupled to be vertical to each other. Alternatively, the module 150 may be rotated at a predetermined angle to be coupled to the support 200 while maintaining the predetermined angle with respect to the support 200.

FIGS. 1 to 9 illustrate a part of several methods for coupling the module 150, in which the module 150 is not limited to the above-mentioned exemplary embodiment but may be coupled with the support 200 in several directions and several methods.

The present invention is not limited to the above-mentioned exemplary embodiments, and may be variously applied, and may be variously modified without departing from the gist of the present invention claimed in the claims.

The invention claimed is:

1. A non-adhesive type vibration reduction apparatus (100) disposed between a vibration source (600) and a structure (700) spaced apart from each other in a z direction based on a 3-dimensional xyz coordinate system, and using an elastomer to reduce a vibration of the vibration source (600) comprising:
    a support (200) formed on an xy plane and coupled to a side of the vibration source (600) which is toward the structure (700);
    a body (300) including an upper side wall (310), a lower side wall (320) spaced apart from the upper side wall (310) by a predetermined distance, and a connection portion (330) connecting between the upper side wall (310) and the lower side wall (320), and coupled to a side of the structure (700) which is toward the vibration source (600);
    the elastomer (400) including a base (410) being coupled to the body (300), a first elastic portion (420) protruding and extending from the base (410) in the z direction, and a protruding portion (430) protruding from the first elastic portion (420) toward the support (200);
    a first cover disposed where the body (300) and the elastomer (400) are coupled; and
    a second cover disposed where the support (200) and the elastomer (400) are coupled,
    wherein an end of the support (200) is provided with a first groove (210),
    wherein the protruding portion (430) is formed to correspond to an inside shape of the first groove (210) and is inserted into the first groove (210) to be coupled thereto,
    wherein the body (300) includes a second groove (340) which is formed on an inner surface of the upper side wall (310) and the lower side wall (320),
    wherein the base (410) has an outside shape corresponding to an inside shape of the second groove (340) and is inserted into the second groove (340) to be coupled thereto,
    wherein the connection portion (330) comprises a side wall (330) enclosing the upper side wall (310) and the lower side wall (320) and a third groove (350) formed on an inner surface of the side wall (330),
    wherein the elastomer (400) further includes a side wall base (440) having an outside shape corresponding to an inside shape of the third groove (350) and the side wall base (440) is inserted into the third groove (350) to be coupled thereto.

2. The non-adhesive type vibration reduction apparatus (100) of claim 1, wherein the elastomer (400) further includes a second elastic portion (450) protruding and extending from the side wall base (440) to the first elastic portion (420).

3. The non-adhesive type vibration reduction apparatus (100) of claim 1, wherein the connection portion (330) comprises a plurality of pillars (330).

4. The non-adhesive type vibration reduction apparatus (100) of claim 1, wherein corners of the respective coupled parts of the support (200), the body (300), the elastomer (400), and the cover (500) have a curvature.

5. The non-adhesive type vibration reduction apparatus (100) of claim 1, wherein the support (200) is provided with a separation portion (220) which is separated from and coupled to the support (200).

6. The non-adhesive type vibration reduction apparatus (100) of claim 5, wherein
    a module (150) consisting of the body and the elastomer is separated by the separation portion (220), and is coupled to the support (200) in several directions by rotating the module (150).

7. The non-adhesive type vibration reduction apparatus (100) of claim 1, wherein a vertical distance from an end of the second cover to an inner wall of the elastomer (400) is less than a vertical distance from the support (200) to an inner wall of the elastomer (400).

8. A non-adhesive type vibration reduction apparatus (100) disposed between a vibration source (600) and a structure (700) spaced apart from each other in a z direction based on a 3-dimensional xyz coordinate system, and using an elastomer to reduce a vibration of the vibration source (600), comprising:
- a support (200) formed on an xy plane and coupled to a side of the vibration source (600) which is toward the structure (700);
- a body (300) including an upper side wall (310), a lower side wall (320) spaced apart from the upper side wall (310) by a predetermined distance, and a connection portion (330) connecting between the upper side wall (310) and the lower side wall (320);
- the elastomer (400) including a base (410) being coupled to the body (300), a first elastic portion (420) protruding and extending from the base (410) in the z direction, and a protruding portion (430) protruding from the first elastic portion (420) toward the support (200); wherein an end of the support (200) is provided with a first groove (210), wherein the protruding portion (430) is formed to correspond to an inside shape of the first groove (210) and is inserted into the first groove (210) to be coupled thereto.

9. The non-adhesive type vibration reduction apparatus (100) of claim 8, further comprising
    a first cover extending across a coupling between the body (300) and the elastomer (400).

10. The non-adhesive type vibration reduction apparatus (100) of claim 8, wherein
    the first cover contacts both the body (300) and the elastomer (400).

11. The non-adhesive type vibration reduction apparatus (100) of claim 8, wherein
    the body is arranged to be coupled to a side of the structure (700) which is toward the vibration source (600).

* * * * *